June 9, 1953    H. T. SEALE    2,641,272
CONVERTIBLE AIR HOSE COUPLING
Filed Sept. 16, 1950
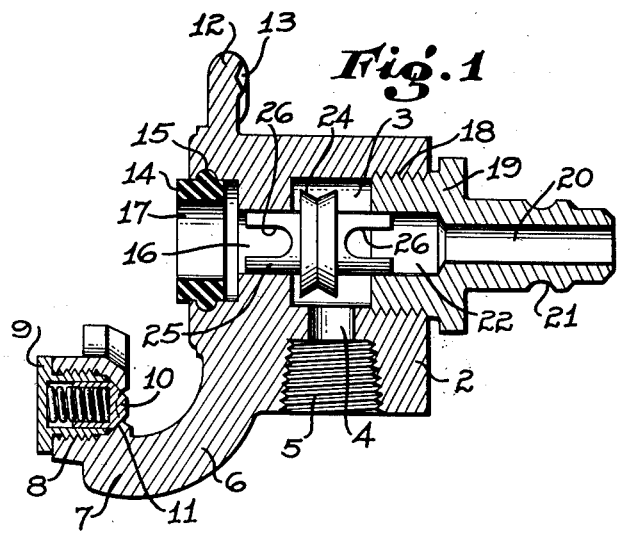
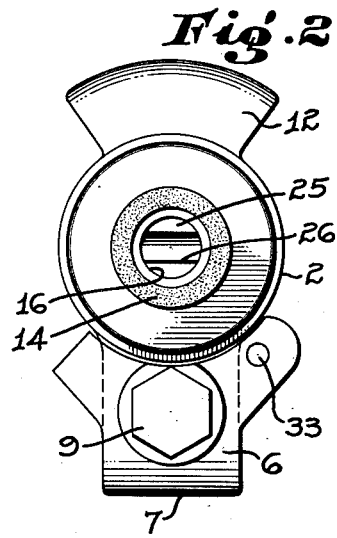
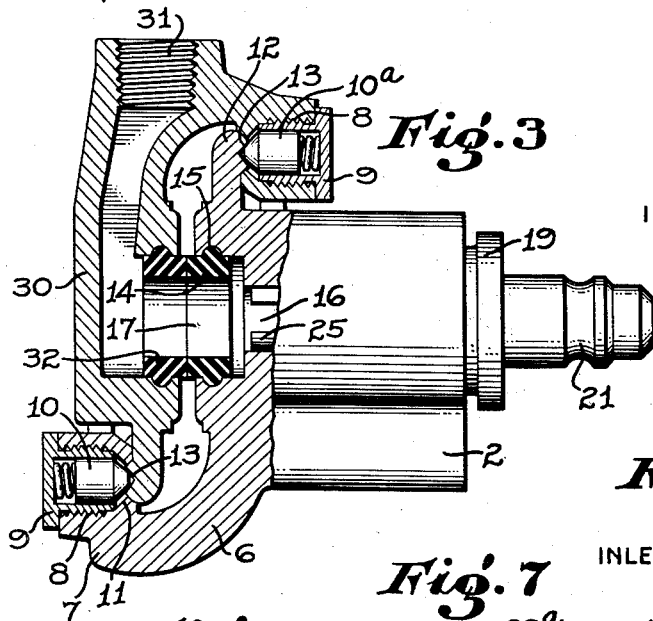
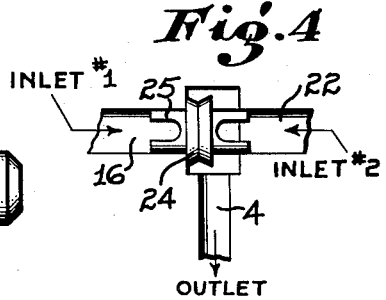
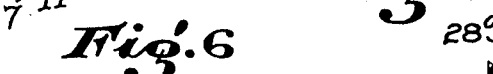
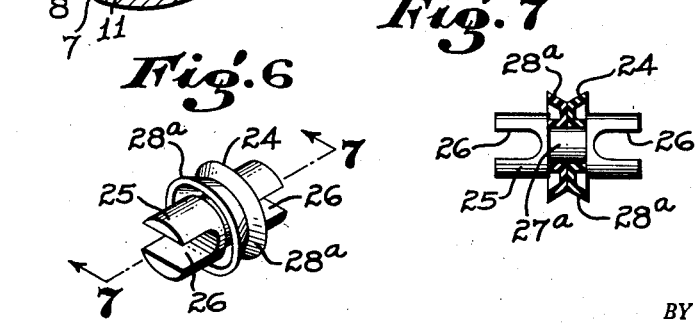
INVENTOR.
HOMER T. SEALE
BY Lyon & Lyon
ATTORNEYS Patented June 9, 1953

2,641,272

UNITED STATES PATENT OFFICE 2,641,272

CONVERTIBLE AIR HOSE COUPLING

Homer T. Seale, Los Angeles, Calif., assignor to Homer T. Seale, Inc., Los Angeles, Calif., a corporation of California Application September 16, 1950, Serial No. 185,186

1 Claim. (Cl. 137—112)

This invention relates to an air hose coupling and while not necessarily confined thereto is primarily intended for coupling air hose between a truck and trailer.

For coupling the air hose between the truck and trailer, or other vehicle, there is at present in common use a type of coupling known as a "glad-hand," which coupling is a compression type coupling, large and bulky and requires that considerable force be applied to the same in order to force together the two parts of the coupling. There is at present a much simpler type of coupling which may be described as a "push-on" sleeve or tubular coupling, which has many advantages over the glad-hand type of coupling. The sleeve or tubular coupling is lighter in weight, more economical in construction and requires less work for coupling air hose. In order that the air hose of a tractor may be coupled to the air hose of the trailer it is necessary, of course, that the tractor and trailer have cooperating parts of the same coupling. Since there is now in existence many thousands of vehicles with the glad-hand type of coupling thereon, it is at present impractical for an operator to adopt the newer improved type of coupling because they are not attachable to the old glad-hand coupling now installed on so many vehicles. This problem exists in any company which has a considerable number of vehicles and is aggravated by the fact that in transportation the vehicles of one company frequently become interchanged with the vehicles of another company.

It is the general object of the present invention to provide an air hose coupler which is constructed and arranged so that such coupler may make a coupling with either the old glad-hand type of coupling part or one of the newer improved push-on or tubular type coupling.

In accordance with the present invention there is provided a coupler having two separate air inlets connecting to the single outlet leading to the vehicle mounting the coupling. One of these inlets is arranged for cooperation with the old type of compression or glad-hand coupler, while the other inlet is constructed and arranged for cooperation with the new push-on sleeve or tubular coupling.

The coupler of the present invention also includes an automatically actuating two-way check valve so constructed and arranged as to automatically close off the inlet passage not in use and open the inlet passage in use.

An important feature of the coupler of the present invention is in the design of the two-way check valve which is constructed and arranged to be free of the danger of assuming the position which obstructs the outlet passage of the coupler. Accordingly, by the use of the coupler of the present invention a vehicle so equipped may be coupled to any other vehicle whether such other vehicle is equipped with one of the older glad-hand type of coupling or one of the newer push-on types of coupling.

Through the use of the coupler of the present invention the operator of a fleet of vehicles may place the coupler of the present invention on all of the newer vehicles which are to receive air and then commence the practice of equipping the vehicles which deliver the air merely with a simple push-on coupler. A period of time will come in the operation of the fleet where the operator has no more vehicles, such as tractors, which are equipped with the old type glad-hand coupler, whereupon the future receiving vehicles may then be provided with the simple push-on type couplers. Thus the coupling of the present invention provides a means by which the operator of a fleet of vehicles may, with minimum disadvantage and cost, convert his fleet from the old type glad-hand coupler to the new type push-on coupler.

Various further objects and advantages of this coupler of the present invention will be apparent from a description of a preferred form or example of a coupler which embodies the invention. I have, therefore, hereafter described, in connection with the accompanying drawings, a preferred example of the coupler.

Referring to the drawings:

Figure 1 is an elevation mainly in vertical section;

Figure 2 is an end view;

Figure 3 is an elevation partially in vertical section of the coupler and a cooperating glad-hand type of coupler connected thereto;

Figure 4 is a diagrammatic view illustrating one operating position of the two-way check valve;

Figure 5 is a similar view illustrating the second operating position of the two-way check valve;

Figure 6 is a prespective view of the movable valve of the two-way check valve; and Figure 7 is a section of the valve member of Figure 6.

Referring to the drawings, the coupler of the present invention comprises a body 2 with a central chamber 3 to which leads bore 4, the outer end of which provides the threaded socket 5 for attachment to an air hose which is to be permanently connected to the coupler in use and lead to the brake and operating apparatus of the vehicle mounting the coupler. The body to the left of the chamber 3 is shaped as a glad-hand coupler 6, which comprises, as illustrated, the hook-shaped extension 7, which is provided with a threaded bore 8 which receives the housing 9 of a spring pressed dog 10, the inner end of the bore 8 being turned in as indicated at 11 to provide means for retaining the dog 10. The coupler also provides the extension 12 having the indent 13 for resiliently locking with a dog of a complementary coupling member. This glad-hand section also includes the usual sleeve 14 of resilient material, such as rubber, which is provided with the bead 15 set in a complementary recess in the body for holding the sleeve in position. A bore 16 connects the chamber 3 of the body with the bore 17 of the sleeve.

The coupler also comprises a threaded socket 18 constituting an extension of the chamber 3 to which is threaded the coupling member 19, provided with the bore 20. This coupling 19 is intended for making connection with a push-on type of hose coupling, and for that purpose is indicated as having the annular groove 21. The inner end of the coupling member 19 has the enlarged bore 22 axially aligned with and of the same diameter as the bore 16.

The coupler of the present invention comprises a two-way check valve and for this purpose there is indicated the valve member 24, which includes the rod 25 having the two slotted ends 26. The rod is provided with an annular groove 27a in which there is mounted the two rubber or resilient packing cups 28a, one extension having a running fit with bore 16 and the other with the bore 22. The valve member 25 is thus slidable axially into one position illustrated in Figure 4, where the passage to the glad-hand type of coupler is cut off, whereas the bore leading to the push-on coupler 19 is in communication with the bore 4. The two-way check valve is also movable to a second position illustrated in Figure 5 where the valve member is in position to cut off the bore 20 and allow communication between the bore 4 and the bore 16 leading to the glad-hand type of coupler.

In use of the coupler of the present invention when, as illustrated, the coupler of the present invention is mounted on the trailer and the bore 4 connected to the usual relay valve and brake mechanism of the trailer, the coupler allows connection to be made with trucks which have either the new push-on type of coupler or the old glad-hand type of coupling element. Figure 3 illustrates, for example, how connection is made to a typical glad-hand type of coupling member 30 by which air may be passed to the coupler 2 of the present invention through a hose connection made to the socket 31 of the coupler 30. In such case it will be observed that the dog 10a of the coupler 30 is engaged with the detent 13, whereas the dog 10 of the coupler 2 engages a similar detent in the coupler 30, and the coupler 30 is provided with a sleeve 32 identical to the sleeve 14, which sleeves are pressed with considerable force axially together to form a fluid type coupling. The coupler of the present invention may be provided with a stop rod 33 extending between the body 2 and the hook-shaped extension 7, which operates to assist in connecting the two coupling parts. When such a coupling is made the pressure of air entering the bore 16 quickly forces the two-way check valve into the position shown in Figure 5 where it closes off the bore 12 and the air entering passes to the hose connected with the socket 5. If the truck is provided with the new axial push-on type of coupling this coupling is merely pushed on the coupling member 17, whereupon the air pressure forces the two-way check valve 25 to the position indicated in Figure 4.

It will thus be seen that by means of the present invention I have provided a coupler which permits either of the two usual conventional types of air hose coupling members to be used in connection therewith, and moreover because of the construction and mode of operation of the two-way check valve, the closing of the coupling section not in use is made automatic.

While the particular device herein described is well adapted to carry out the objects of the present invention various modifications may be made and this invention is of the scope set forth in the appended claim.

I claim:

An air hose coupler comprising a body having a central recess connected with two axially aligned bores, a valve member having a central flange and two axially aligned slotted extensions, one mounted in each bore movable to alternately close said bores, an outlet bore from said recess, a coupling member comprising a resilient sleeve connected with one of said bores, an extension having a detent at one side of said sleeve, and a hook-shaped member having a spring pressed dog extending to the other side of said sleeve, the other bore having a coupling member in the form of a hollow pin having an annular recess.

HOMER T. SEALE.

References Cited in the file of this patent

UNITED STATES PATENTS

| Number | Name | Date |
|--------|------|------|
| 279,562 | Haight | June 19, 1883 |
| 882,503 | Kilpatrick | Mar. 17, 1908 |
| 1,790,480 | MacComber | Jan. 27, 1931 |
| 1,947,593 | Hamilton | Feb. 20, 1934 |
| 2,399,275 | Wenk | Apr. 30, 1946 |